UNITED STATES PATENT OFFICE.

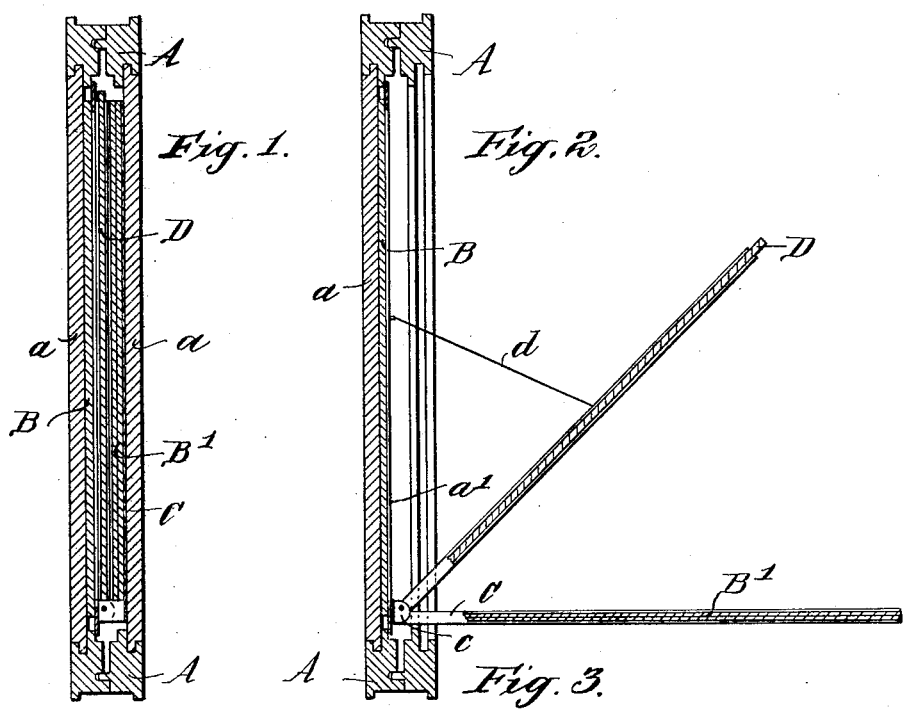
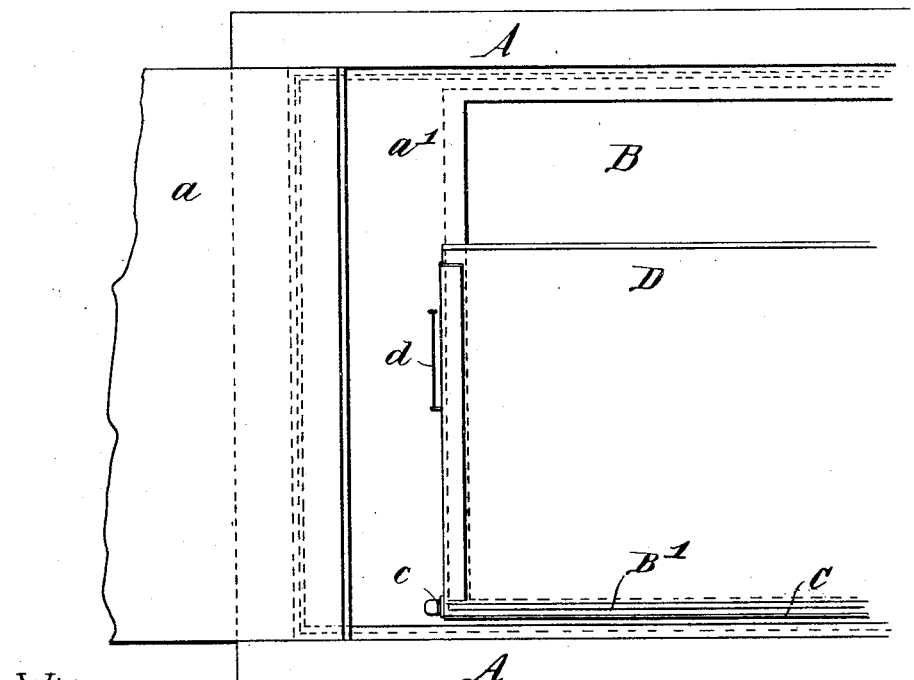

WILLIAM NORMAN LASCELLES DAVIDSON, OF SOUTHWICK, ENGLAND.

PHOTOGRAPHIC-PLATE HOLDER.

SPECIFICATION forming part of Letters Patent No. 701,306, dated June 3, 1902.

Application filed December 5, 1901. Serial No. 84,807. (No model.)

*To all whom it may concern:*

Be it known that I, WILLIAM NORMAN LA-SCELLES DAVIDSON, a subject of the King of Great Britain and Ireland, residing at Southampton House, Southwick, in the county of Sussex, England, have invented certain new and useful Improvements in Photographic-Plate Holders, of which the following is a specification.

This invention relates to improvements in apparatus for obtaining photographic pictures in natural colors by means of the three-color process; and it consists of a plate-holder adapted for use in ordinary cameras in which the whole apparatus is contained.

The apparatus is based upon a principle already in use, in which the picture is projected by a lens directly upon one plate, passing through a colored glass or screen tilted at an angle in front of the plate, and also reflected by the screen upon two other plates placed at right angles to the first, these plates being placed film to film with or without a separating layer. The three photographic plates are rendered sensitive only to definite colors—such as red, yellowish green, and blue or such other colors as may be found desirable. According to my invention a plate-holder contains the three sensitive plates and the screen or reflector, and the plate-holder is constructed so that when inserted in the camera and the shutter withdrawn the carrier containing two (or one) of the plates is turned into horizontal position, while the screen or reflector simultaneously turns about half-way—that is, to an angle of about forty-five degrees inside the camera. The plates and screen are then in a position to receive the image formed by the lens in the desired manner.

In order that this invention may be more readily understood, reference is had to the accompanying sheet of drawings, in which—

Figure 1 is a section of a plate-holder constructed according to my invention, showing it in closed position. Fig. 2 is a similar view with the plate-holder opened in the position taken upon exposure, and Fig. 3 is a front view of the open plate-holder.

A is the frame or body of the plate-holder of the ordinary double pattern, having the sliding shutters or covers $a$ at front and back.

In the back of the plate-holder is placed the plate B, this plate being placed in position as in the ordinary plate-holder, taking up the position, however, of the plate which is not being exposed in the ordinary photographic process. The other plates B' (two being shown) are placed face to face in the hinged carrier C at the front of the plate-holder. This carrier can drop down into the horizontal position, as shown especially in Fig. 2, and is held in that position by the small stop or shoulder $c$, which abuts against the divisions $a'$ of the plate-holder. As mentioned above, the two plates B' can be placed in direct contact with each other or a layer of colored transparent material can be placed between them, the color of this layer being that to which the lower film is sensitive.

Between the plates B and B' is placed the glass screen or reflector D, which is hinged and is adapted to drop down into the position shown in Figs. 2 and 3 at about an angle of forty-five degrees to the slide or back plate B. It is retained in this position by any ordinary device, such as the fine cord $d$, attached to the side of the carrier.

The general arrangement of the plates according to the method hitherto in use is as follows: The plate B is extremely sensitive to red rays, but is not acted upon appreciably by other colors, and the image produced by the lens is focused directly upon the plate, the light passing through a red glass D on its way to the plate. Part of this light is reflected down by the glass upon the plates B' below, which are placed in such a position that the image is in focus after reflection upon them. The upper one of these plates may be a slow chlorid film which is practically sensitive only to blue, and below this plate a second plate or film very sensitive to green and yellow is placed, the two films being in contact or separated by a very thin green or yellow color-filter. If the speed of the plates is adjusted properly, the plate B will record the image produced by the red rays, and the other plates will record the same image produced by the other colors with densities which are in proportion to the natural strength of the different rays. According, however, to a novel arrangement I also propose to employ the blue and green plates are placed in the back of the plate-holder, while a very sensitive red plate is placed in the carrier C and covered by a red screen or filter, the arrangement being the same as that illustrated in the drawings, the upper plate B' representing the red screen. The glass D in this case is not colored, but acts merely as a reflector and not a color-filter. Part of the light passes directly through the glass to the back plates, and part is reflected down upon the plate in the hinged carrier passing through the red screen covering it. The action of the apparatus in both cases is substantially the same. On the plate-holder being placed in the camera and after withdrawing the shutter in front in the usual manner for exposure the hinged carrier and the glass at once drop down into the desired position inside the camera, and the exposure can be given in the usual manner. To return the parts into collapsed position before withdrawing the plate-holder, the camera can be tilted back, or any suitable mechanical device operated from the outside will raise the plates and collapse them into the plate-holder. The slide may of course be reversed, so that the hinged plate-carrier and reflector are raised into horizontal and tilted position, the action being otherwise similar to that already described. It is necessary to prevent light passing through the lens directly impinging upon the horizontal plates, which should therefore be shielded from the lens.

The hinged carrier and reflector are applicable both to single and stereoscopic work.

What I claim as my invention, and desire to secure by Letters Patent, is—

1. In a photographic-plate holder adapted for three-color photography, a plate-carrier hinged within the slide turning into position at right angles to the slide for exposure and a screen-reflector hinged behind the carrier adapted to turn through about half a right angle and to reflect part of the light from the lens upon the horizontal plates in the carrier, substantially as herein described.

2. In a photographic-plate holder, having a plate fitted in the back, a hinged plate-carrier C at the front adapted to take up a horizontal position for exposure, a hinged screen-reflector D between the back and the carrier C and an attachment $d$ retaining the reflector at an angle of about forty-five degrees to the slide when opened, the whole adapted for three-color photography, substantially as herein described and shown.

In witness whereof I have hereunto set my hand in the presence of two witnesses.

WILLIAM NORMAN LASCELLES DAVIDSON.

Witnesses:
ERNEST HARPER KEMPE,
ARCHIBALD GREVETH.